United States Patent [19]

Temple et al.

[11] 4,396,723

[45] * Aug. 2, 1983

[54] LIGHTWEIGHT SILICATE AGGREGATE

[75] Inventors: Ralph E. Temple, Chardon; William T. Gooding, Jr., Mentor, both of Ohio

[73] Assignee: Diamond Shamrock Corporation, Dallas, Tex.

[*] Notice: The portion of the term of this patent subsequent to May 20, 1997, has been disclaimed.

[21] Appl. No.: 122,375

[22] Filed: Feb. 19, 1980

Related U.S. Application Data

[63] Continuation-in-part of Ser. No. 959,517, Nov. 13, 1978, Pat. No. 4,203,773.

[51] Int. Cl.³ .................... C04B 21/00; C04B 31/02
[52] U.S. Cl. ........................................ 501/80; 106/75
[58] Field of Search ............... 106/40 R, 75, 288 B; 252/62; 501/80

[56] References Cited

U.S. PATENT DOCUMENTS

| | | | |
|---|---|---|---|
| 3,663,249 | 5/1972 | Rao | 106/75 |
| 3,719,510 | 3/1973 | Temple et al. | 106/75 |
| 3,728,208 | 4/1973 | Whittington | 106/40 R |
| 3,743,601 | 7/1973 | Rao | 106/75 |
| 3,756,839 | 9/1973 | Rao | 106/75 |
| 3,765,919 | 10/1973 | Gelbman | 106/288 B |
| 4,080,187 | 3/1978 | Parnell | 106/40 V |
| 4,081,392 | 3/1978 | Carosello | 106/75 |
| 4,131,543 | 12/1978 | Carosello | 210/36 |
| 4,203,773 | 5/1980 | Temple et al. | 106/40 R |

*Primary Examiner*—Mark Bell
*Attorney, Agent, or Firm*—William A. Skinner

[57] ABSTRACT

An improved process for the preparation of an expanded, water insoluble silicate aggregate. Anhydrous alkali metal silicate is hydrated in the presence of a curing agent, then is subjected to rapid thermal expansion. The process eliminates the use of liquid silicates, and the reaction is conducted in an essentially dry state. The expanded product has extremely low bulk density. When combined with a suitable binder and applied to various substrates, the aggregate functions as an excellent thermal barrier.

6 Claims, No Drawings

LIGHTWEIGHT SILICATE AGGREGATE

CROSS-REFERENCE TO RELATED APPLICATION

This is a continuation-in-part of copending application Ser. No. 959,517, filed Nov. 13, 1978 now U.S. Pat. No. 4,203,773.

BACKGROUND OF THE INVENTION

The production of inorganic silicate materials by the thermal expansion of hydrated silicates has been disclosed in the prior art. Many of the known methods utilize the liquid content of the silicate composition as a blowing agent to produce a cellular structure. Such foamed masses exhibit good thermal and acoustical insulating properties and have been used in a variety of construction materials. Wallboard has been prepared, for example, by the formation of a plastic silicate-containing composition between paper liners, followed by thermal expansion of the silicate. In addition, granules of silicate have been expanded at high temperatures to form "popcorn" materials useful in insulating applications.

One difficulty with many of these silicate-based materials is their deterioration upon exposure to water for extended periods of time. In an attempt to overcome this water solubility, processes have been developed wherein various insolubilizers are added to the silicate composition. Two such processes are described in U.S. Pat. No. 3,719,510 and U.S. Pat. No. 3,765,919. These patents disclose the preparation of expanded silicate aggregates by mixing aqueous alkali metal silicate with anhydrous alkali metal silicate, dispersing insolubilizer additives into the liquid, curing the fluid composition, drying, then grinding and thermally expanding the material.

Although the aggregate products obtained by these methods have good physical properties, the processes involve several steps which are difficult to control. Liquid alkali metal silicate must initially be mixed with anhydrous silicate in precisely the correct ratio to eventually produce a properly hydrated silicate. The insolubilizer additives must then be admixed before the viscosity of the liquid composition increases to the point that uniform dispersion of the additives becomes impossible. The resulting viscous plastic composition must then be rapidly transferred from the mixer to the curing operation in order to prevent separation of solids and to avoid a difficult removal problem should the mixture cure too rapidly. Heat is also required throughout the mixing process in order to maintain the composition in the desired liquid or plastic state prior to curing.

In addition, the insolubilizer additives may be dusty and difficult to handle and increase the cost of the aggregate product. They also tend to increase the bulk density of the aggregate.

It would, therefore, be desirable to provide a process which does not require the handling and measurement of liquid silicates having varying ratios of alkali metal oxide to silicon dioxide. In addition, it would be an advantage to provide a method in which the silicate composition remains in an essentially dry state until the curing stage, eliminating the problems associated with drying operations and the handling and mixing of viscous masses. A further advantage would reside in the reduction or complete elimination of insolubilizer additives.

SUMMARY OF THE INVENTION

It has been discovered that the preparation of water insoluble expanded silicate aggregates can be improved by initially mixing anhydrous alkali metal silicate with a curing agent, adding only water to hydrate the mixture, and curing. The silicate composition is thereby maintained in an essentially nonliquid state throughout the hydration. After curing and crushing, the aggregate is thermally expanded by rapid heating.

More specifically, in the process of the invention, anhydrous alkali metal silicate is thoroughly mixed with a curing agent and, optionally, with a minimum amount of high temperature insolubilizer capable of reacting with the silicate. Water alone is added in an amount sufficient to bring the total $H_2O$ content of the mixture to about 17-25 percent, by weight, to hydrate the mixture. Mixing is continued until the components form a homogeneous, free-flowing, powdery composition which is cured at temperatures below 100° C. at ambient pressure until the mixture is substantially completely hydrated, i.e., essentially no free moisture remains. The cured composition is comminuted to discrete particles of the desired size, if necessary, and the particles are then thermally expanded by rapid heating to at least 425° C. The resulting aggregate is extremely lightweight, with a bulk density of less than 56 kg per cubic meter.

The improved process of the invention provides numerous advantages, including elimination of the handling and measurement of liquid alkali metal silicates. A more uniform blend of curing agent into the dry composition is obtained, and the proper ratio of water to silicate in the final mixture is considerably easier to achieve. Further, in the process, the composition remains in a nonliquid state in which it is easily handled and moved through the processing operations. No viscous or plastic liquids are produced thereby eliminating processing and cleanup difficulties.

An additional advantage of the invention lies in the fact that excessively high temperatures and pressures are not required to hydrate the silicate. The use of live steam is not involved, and complex pressurized equipment is not necessary. Further, no drying step is required prior to thermal expansion.

The expanded aggregate prepared according to the invention also is ideally suited for use as a thermal barrier on various substrates. The aggregate is applied to the substrate in combination with a binder, providing excellent thermal protection.

DETAILED DESCRIPTION OF THE INVENTION

The anhydrous alkali metal silicates useful in the practice of the invention include sodium and potassium silicates having an alkali metal oxide:silicon dioxide mole ratio in the range of 1:3–1:4. Generally, anhydrous sodium silicate having an $Na_2O:SiO_2$ mole ratio of 1:3.1–3.3 is preferred, this being the material most readily available commercially and one which provides the desired properties of low density and insolubility in the aggregate product.

The curing agents useful in the method of the invention include boron-containing compounds such as boric acid, boric oxide (boric anhydride), sodium borate, and the like. Preferred curing agents are boric acid and boric oxide, in granular or powder form. The amount of curing agent used has a direct effect on the density of the aggregate product, and, in general, a boron content in the range of 0.5–2.5 percent, by weight, in the anhydrous mixture is preferred. Elimination of the curing agent results in a product having undesirably high density.

The optional high temperature insolubilizers are those capable of reacting with the silicate portion of the alkali metal silicate at the temperatures involved in the expansion operation. Exemplary of these materials are divalent and trivalent metallic salts such as calcium and magnesium silicate; portland cement; silica; zinc, iron, aluminum and lead oxides; calcium and magnesium phosphates (mono-, di-, and tribasic); calcium, barium, and magnesium salts; and fly ash. The amount normally used should be only that required to impart to desired insolubility characteristics to the expanded aggregate. Less than the theoretical amount required for complete reaction with the silicate will achieve this effect. As the cost of the insolubilizer is sometimes greater than that of the silicate, and the presence of large quantities tends to increase the density of the aggregate, it is apparent that the use of minimum amounts of insolubilizer is desirable. In general, the secondary insolubilizer is present in the range of 0–25 percent, by weight.

The curing agent, optional insolubilizer, and the anhydrous alkali metal silicate are thoroughly blended in an appropriate apparatus until the composition is substantially homogeneous. Water is then added to the dry blend to completely hydrate the ingredients. The amount of water added is that sufficient to provide from 17–25 percent, by weight, of $H_2O$ in the total composition. Adjustment may be necessary to compensate for the $H_2O$ content of the curing agent. A final $H_2O$ content of 19–23 percent, by weight, is preferred. Mixing is continued until a homogeneous, free-flowing powdery composition is formed. The time of mixing will, of course, vary with the type of mixer used and the amount of silicate being processed, but homogeneity is usually obtained in less than 15 minutes.

Once a homogeneous mixture is obtained, the composition is cured, preferably at elevated temperature and humidity, to insure complete hydration of the anhydrous silicate. The curing step can be carried out at any temperature above about 65° C. and up to about 100° C. at atmospheric pressure; however, temperatures in the range of 80°–95° C. are preferred. About 65° C. is an apparent threshold temperature below which the exothermic curing will not initiate. One technique for raising the temperature of the entire system sufficiently to initiate the curing is the use of heated water in the prior mixing step. With the addition of warm water alone, the energy input into the system is sufficient to begin the curing almost immediately upon formation of the homogeneous mixture, and the cure is rapidly completed by the exothermic reaction. The exotherm during hydration may even drive the temperature of the composition over 100° C. and thus complete the curing in a very short period without additional energy input. Of course, the energy required to attain the threshold temperature may also be supplied by the use of heated silicate, curing agent, or insolubilizer.

A high relative humidity during the curing is desirable to prevent excessive moisture loss and thus incomplete hydration of the mix, particularly at the air/solid interface. Humidity levels of 90 percent and above are preferred. The curing may be complete in less than 2 hours under optimum conditions, although the time required varies considerably with such factors as temperature, humidity, amount of silicate, and amount of curing and insolubilizing agents. During the curing, the composition is maintained in a substantially nonliquid state, and the operation may be conducted in any convenient equipment.

During the curing step, the discrete silicate particles will coalesce to form a solid mass. The cured composition is friable and is easily comminuted into discrete free-flowing particles of any desired size. In the process of the invention, particles of less then about 4 mm (5 mesh) in diameter are preferred in order to obtain a final expanded product of optimum low bulk density. The grinding of the cured composition can be done in conventional equipment, and, of course, the particles may be screened and sized as necessary to remove oversize particles or fines for further processing or recycling. The discrete cured particles, if properly prepared, may be stored or shipped in the unexpanded state while remaining free-flowing. The advantage of this property is clear in both storing and shipping, as the expanded product may have 25 times the volume of unexpanded particles.

The final step in the process is rapid thermal expansion of the particles. In order to obtain a product having the desired low bulk density, it is necessary that the particles be exposed to high temperatures in a short period of time. Heating slowly or at too low a temperature will cause expansion of only the surface of the particles, effectively insulating the particle core and preventing full expansion. While the required temperature will, of course, vary with the particle size, temperatures in the range of about 425°–750° C. will normally be effective. The expansion may be carried out in any suitable equipment, such as a rotary or vertical shaft kiln, so long as the heat is rapidly transferred to the unexpanded particles. It is preferred that the expander equipment be capable of heating the particles to above about 425° C. in less than about 15 seconds to insure full expansion.

The expanded silicate aggregate product typically consists of white or off-white particles having a bulk density of less than about 56 kg per cubic meter, and usually less than 32 kg per cubic meter for material containing no optional insolubilizer. The material is substantially insoluble in cold water and has a compressive strength of about 350–750 kg per square meter for a 5 percent volume compression. The aggregate has a low thermal conductivity of 0.033–0.045 W $m^{-1}°K^{-1}$. The product is noncombustible and essentially inert.

The expanded material has a wide range of uses as thermal insulation, in such areas as loose fill for construction insulation, spray-on insulation in conjunction with suitable binders, underlayment, vehicle and appliance insulation, and the like. It also has high fire resistance and, therefore, is useful for many types of fire barriers. It is particularly well suited for use as a thermal barrier on a variety of substrates, including wood, plaster, concrete, and steel. When applied in combination with an adhesive, its characteristics can be varied to suit the application. For example, a low density coating may be applied to the substrate to provide optimum insulation against thermal conductivity, or the coating can be made more dense to provide a barrier to thermal radiation. The binder may be inorganic, organic, or a combination, and suitable materials include silicates, magnesium phosphates, cements (Portland, Sorel), epoxies, latex emulsions, polyesters, acrylic emulsions, phenolics, and polyvinyl alcohol. The aggregate-binder barrier may be applied by conventional methods such as spraying or troweling.

The aggregate has considerable capacity as a sorbent and is useful in the cleanup of liquid spills, as a chemical carrier, gas and vapor sorbent, vapor suppressant, and sweeping compound. Additional applications include acoustical insulation, refractory material, filler for other compositions, energy attenuator, soil conditioner, filter media, and substrate.

The lightweight aggregate product of the invention can also be treated with a water-repellent agent to increase its hydrophobic characteristics. Silicones are the preferred additives for this purpose. The water-repellent agent can either be sprayed directly onto the aggregate particles after expansion or incorporated into the aggregate by addition to the process water during preparation. Either method results in an aggregate product which is useful in the adsorption of nonaqueous materials in the presence of water and in other applications where high water repellency characteristics are desirable.

The process of the invention is further illustrated in the following specific examples.

EXAMPLE 1

In a plant-scale operation, 680 kg of anhydrous sodium silicate having an $Na_2O:SiO_2$ mole ratio of 1:3.26 and a particle size range of 95 percent less than 65 mesh (U.S. sieve series) was thoroughly mixed with 33 kg of $B_2O_3$ powder. To this mixture was added 215 liters of water, and mixing was continued for about 30 minutes. The resulting free-flowing composition was then cured overnight at about 93° C. in a covered container. The cured composition was friable and was ground in a hammer mill, screened, and classified into two portions.

The portion having a particle size range of less than 8 mesh and greater than 14 mesh was passed upwardly through a conical expander where it was subjected to an average temperature of about 510° C. over a period of about 10 seconds. The resulting expanded aggregate had a bulk density of 27.2 kg per cubic meter.

The portion having a particle size range of less than 14 mesh and greater than 64 mesh was expanded in a similar fashion at an average temperature of about 540° C. The resulting aggregate had a bulk density of 20.8 kg per cubic meter.

EXAMPLE 2

The procedure of Example 1 was generally repeated, utilizing 1360 kg of 1:3.26 ratio anhydrous sodium silicate, 136 kg of $H_3BO_3$ powder as curing agent, and adding 213 kg of Portland IA cement as a high temperature insolubilizer. To this dry mixture was added 427 liters of water, followed by mixing, curing overnight at 93° C., grinding and classifying.

The portion having a particle size range of less than 8 mesh and greater than 14 mesh was rapidly expanded at an average temperature of about 495° C., and the resulting product had a bulk density of 43.2 kg per cubic meter. The portion having a particle size range of less than 14 mesh and greater than 64 mesh was expanded at an average temperature of about 540° C., and the product had a bulk density of 33.6 kg per cubic meter.

EXAMPLE 3

The procedure of Example 1 was generally repeated, utilizing 681 kg of 1:3.26 ratio anhydrous sodium silicate, 36 kg $B_2O_3$ powder as a curing agent, 107 kg Portland IA cement, and 242 liters of water. Prior to curing 4100 ml of General Electric SM 2137 silicon emulsion (50 percent aqueous) was added to the mixture. The composition was thoroughly mixed, cured, comminuted and classified.

The portion having a particle size range of less than 6 mesh and greater than 14 mesh was expanded at an average temperature of about 495° C., and the resulting product had a bulk density of 52.8 kg per cubic meter. The portion having a particle size range of less than 14 mesh and greater than 64 mesh was expanded at an average temperature of about 595° C., and the resulting product had a bulk density of 41.6 kg per cubic meter.

EXAMPLE 4

A series of aggregates was prepared by adding 126 grams 1:3.22 ratio anhydrous sodium silicate, 21 grams portland cement, 13 grams $H_3BO_3(\frac{1}{2}B_2O_3.3/2H_2O)$, and water to a Hobart mixer, and blending until homogeneous free-flowing composition was obtained. The amount of water added was varied to provide a range of $H_2O$ content in the compositions prior to curing. The compositions were cured overnight at about 90° C. and close to 100 percent relative humidity. They were then ground and screened to obtain samples in the particle size range of less than 12 mesh and greater than 50 mesh. The particles were expanded by dropping them onto the surface of a hot plate maintained at 430° C. Bulk densities were determined, and the results are set forth in Table 1.

TABLE 1

| Water Added (g.) | Total $H_2O$ Content (wt. %) | Bulk Density (kg/m³) |
| --- | --- | --- |
| 28 | 17.9 | 40.0 |
| 32 | 19.6 | 35.2 |
| 36 | 21.3 | 33.6 |
| 40 | 22.9 | 33.6 |
| 44 | 24.4 | 30.4 |
| 48 | 25.8 | 60.8 |
| 52 | 27.2 | 56.0 |

EXAMPLE 5

Aggregates prepared followed the procedures of Examples 1 and 2 were tested for capacity to absorb oil. Aggregate was classified −14, +60 mesh, weighed, placed in a screen enclosure, and immersed in No. 2 fuel oil for 5 minutes. The enclosure was then removed from the oil, allowed to drain for 5 minutes, and the aggregate was again weighed. The aggregate of Example 1 had an oil sorbency capacity of 16 times its weight, while the aggregate of Example 2 had a capacity of 9 times its weight.

EXAMPLE 6

Aggregate of the invention was prepared by mixing 147 grams of 1:3.26 ratio anhydrous sodium silicate and 12.8 grams of $H_3BO_3$ in a Hobart mixer, then blending in 40 grams of water until a homogeneous free-flowing composition was obtained. This composition was cured for approximately 16 hours at about 90° C. After crushing, the particles were rapidly expanded on a hot plate surface at about 430° C. The bulk density of the resulting aggregate was 17.6 kg per cubic meter.

EXAMPLE 7

Aggregate prepared according to the procedure of Example 2 was treated with water repellent using the following method. About 0.9 kg of expanded aggregate (classified to −30, +60 mesh prior to expansion) was placed in a revolving drum mixer with a polyethylene liner. As the drum rotated, the aggregate was sprayed with a solution of 4.5 ml General Electric SM 2137 silicone emulsion diluted with 100 ml of water. After treatment, the aggregate was dried at about 260° C., and the silicone content was calculated to be about 0.25 percent, by weight.

The water repellency of this material was compared to that of untreated aggregate by a standard water repellency test (Perlite Institute, Designation 303). This test determines the ability of the material to repel water by pouring water through a standard volume bed of aggregate and measuring the amount of water passing through. The untreated aggregate of the invention had a repellency of 69 percent, while the aggregate treated as described had a repellency of 88 percent.

The hydrocarbon sorption capabilities of the treated aggregate after exposure to water were also measured by the following method. Ten gram samples of treated aggregate were placed in contact with water, with stirring for 5 minutes. The aggregate was removed from the water, drained for 5 minutes and weighed. Excess hydrocarbon was then floated on the surface of the water. The aggregate was placed in contact with the hydrocarbon for 5 minutes, then was removed, allowed to drain for 5 minutes and reweighed. The amount of hydrocarbon sorbed by 10 grams of aggregate is set forth in Table II.

TABLE II

| | |
|---|---|
| Amyl acetate | 114 grams |
| Cyclohexane | 120 |
| Ethyl benzene | 113 |
| Isoprene | 89 |
| Methyl methacrylate | 115 |
| Styrene | 150 |
| Toluene | 110 |
| Xylene | 139 |

EXAMPLE 8

The effect of temperature on the curing reaction was evaluated by preparing a mixture containing 63 weight percent 1:3.22 ratio anhydrous sodium silicate, 10.5 percent portland cement, 3.7 percent $B_2O_3$, and 22.8 percent water, then dividing this mix into three portions. The first portion was allowed to stand at room temperature. After 96 hours there were no signs of curing. The second portion was placed in a 2.5 kw microwave oven and heated to a temperature of about 60° C., then was removed from the oven and placed in an insulated box. After 48 hours, the mixture showed no signs of curing. The third portion was heated to about 65° C. in the microwave oven, then was removed to an insulated box. Within 15 minutes an exothermic reaction had begun, and the mixture was cured within 2 hours.

EXAMPLE 9

An aggregate such as that prepared in Example 1 was mixed with Portland cement in a ratio of 8:1 (aggregate:cement), by volume, and was applied to 12"×12"×0.25" steel plates using a Reed Gunnite machine. Water was mixed with the material at the spray nozzle. The coated articles were subjected to fire testing following ASTM Procedure E-119 and compared to articles coated with competitive thermal barriers. The results are set forth in Table III, showing the time required for the steel substrate to reach 1000° F. (538° C.).

TABLE III

| | Coating Dry Wt. (lbs/ft²) | Time to 1000° F. (Min.) | Time to 1000° F. per lb. coat/ft² |
|---|---|---|---|
| Product A | 5.1 | 131 | 25.9 |
| Product B | 3.0 | 105 | 36.2 |
| Invention | 3.6 | 131 | 36.3 |

EXAMPLE 10

About 30 g of an expanded aggregate such as that prepared in Example 2 was mixed in a Hobart mixer with 150 ml of water and 100 ml of a vinyl acetate based liquid adhesive (Adhesive 901, a product of the Strong Adhesive Corporation). After complete mixing, the material was troweled onto a wooden substrate to a depth of about 0.5 inch. When dry, the composition formed a stable coating with good thermal insulating characteristics.

What is claimed is:

1. A process for the preparation of a silicate aggregate, which process comprises the steps of:
   (a) mixing anhydrous alkali metal silicate and sufficient boron-containing curing agent to provide a boron content of about 0.5–2.5 percent in the mixture,
   (b) adding water to provide at least about 17 percent, by weight, of the total mixture,
   (c) mixing until a homogeneous, free-flowing composition is obtained,
   (d) curing the composition until the silicate is hydrated, while maintaining the composition in a substantially nonliquid state.

2. The process of claim 1, with the additional step of:
   (e) comminuting the composition into discrete free-flowing particles capable of thermal expansion to a lightweight aggregate.

3. The process of claim 2, with the additional step of:
   (f) expanding the particles by rapid heating.

4. The process of claim 1 wherein up to about 25 percent of an insolubilizer capable of reacting with the silicate portion of the anhydrous alkali metal silicate during a subsequent expansion is added to the composition.

5. The process of claim 1 wherein the curing step is initiated by the use of heated ingredients in step (a).

6. The process of claim 1 wherein the curing is initiated by the addition of heated water in step (b).

* * * * *